US011931790B1

(12) United States Patent
Hayes

(10) Patent No.: US 11,931,790 B1
(45) Date of Patent: Mar. 19, 2024

(54) PUNCHING DEVICE MAKING LARGE RECTANGULAR HOLES IN RECTANGULAR TUBING AND METHOD THEREOF

(71) Applicant: Charles D. Hayes, Glen Burnie, MD (US)

(72) Inventor: Charles D. Hayes, Glen Burnie, MD (US)

( * ) Notice: Subject to any disclaimer, the term of this patent is extended or adjusted under 35 U.S.C. 154(b) by 154 days.

(21) Appl. No.: 17/136,531

(22) Filed: Dec. 29, 2020

Related U.S. Application Data

(60) Provisional application No. 63/071,568, filed on Aug. 28, 2020.

(51) Int. Cl.
*B21D 28/28* (2006.01)
*B21D 28/34* (2006.01)
(Continued)

(52) U.S. Cl.
CPC ............ *B21D 28/28* (2013.01); *B21D 28/34* (2013.01); *B21D 43/003* (2013.01);
(Continued)

(58) Field of Classification Search
CPC ........ B21D 28/28; B21D 28/34; B21D 28/00; B21D 43/003; B21D 45/03; B21D 43/00; B21D 45/00; B26D 5/12; B26D 7/01; B26F 1/0053; B26F 1/14; B26F 1/40; B26F 1/00; Y10T 83/0596
(Continued)

(56) References Cited

U.S. PATENT DOCUMENTS 3,234,838 A 2/1966 Faull
3,785,236 A * 1/1974 Peterson ................ B21D 28/14 83/694
(Continued)

FOREIGN PATENT DOCUMENTS

CN 202570956 U 12/2012
CN 203621191 U 6/2014
(Continued)

OTHER PUBLICATIONS

CN 209598355 U, Translation (Year: 2023).*
(Continued)

*Primary Examiner* — Nhat Chieu Q Do
(74) *Attorney, Agent, or Firm* — Rosenberg, Klein & Lee

(57) ABSTRACT

A rectangular tubing, rectangular hole punching device includes a two-sided die carried by a mandrel upon which a rectangular tubing workpiece is sleeved. The two-sided die makes possible a punched rectangular hole having a width extending substantially from one interior lateral side wall of the workpiece adjacent the side of the workpiece being punched to the opposing interior side wall of the workpiece adjacent the side of the workpiece being punched, and includes a pair of tool steel die pieces that are longitudinally spaced from each other. The portions of lateral side walls corresponding to the position of the two sided die within the workpiece are supported against deformation from punching by applying a high compressive force to the portions of the laterally spaced side walls of the workpiece that are in correspondence with the position of the two-sided die, during the punching operation.

17 Claims, 10 Drawing Sheets

(51) Int. Cl.

| | |
|---|---|
| ***B21D 43/00*** | (2006.01) |
| ***B21D 45/00*** | (2006.01) |
| ***B26D 5/12*** | (2006.01) |
| ***B26D 7/01*** | (2006.01) |
| ***B26F 1/00*** | (2006.01) |
| ***B26F 1/14*** | (2006.01) |
| ***B26F 1/40*** | (2006.01) |

(52) U.S. Cl.
CPC ............. *B21D 45/003* (2013.01); *B26D 5/12* (2013.01); *B26D 7/01* (2013.01); *B26F 1/0053* (2013.01); *B26F 1/14* (2013.01); *B26F 1/40* (2013.01); *Y10T 83/0596* (2015.04)

(58) Field of Classification Search
USPC ................................................................ 83/54
See application file for complete search history.

(56) References Cited

U.S. PATENT DOCUMENTS

| | | | | |
|---|---|---|---|---|
| 3,939,748 | A | 2/1976 | Scott et al. | |
| 3,971,275 | A | 7/1976 | Mach | |
| 4,930,384 | A | 6/1990 | Nakatsuji | |
| 5,421,086 | A | 6/1995 | Le Gauyer | |
| 5,765,420 | A | 6/1998 | Schaefer | |
| 6,718,860 | B2 | 4/2004 | Mitsukawa et al. | |
| 2009/0121405 | A1 * | 5/2009 | Brown | B25B 1/16 269/216 |

FOREIGN PATENT DOCUMENTS

| | | | | | |
|---|---|---|---|---|---|
| CN | 203778573 | U | | 8/2014 | |
| CN | 203955853 | U | | 11/2014 | |
| CN | 104624782 | A | | 5/2015 | |
| CN | 104826920 | A | | 8/2015 | |
| CN | 207238888 | U | | 4/2018 | |
| CN | 108202100 | A | * | 6/2018 | B21D 28/28 |
| CN | 208288764 | U | | 12/2018 | |
| CN | 208613568 | U | | 3/2019 | |
| CN | 209598355 | U | * | 11/2019 | |
| JP | H0647459 | A | * | 2/1994 | |
| JP | 3313413 | B2 | | 8/2002 | |
| KR | 20040006290 | A | | 1/2004 | |
| KR | 101779663 | B1 | | 9/2017 | |

OTHER PUBLICATIONS

CN 108202100A, Translation (Year: 2023).*

UniPunch, "Tube Punching with Mandrel", https://www.unipunch.com/system-capabilities/typical-work-done/tube-punching-with-mandrel/ (last visited Jan. 7, 2021).

* cited by examiner

PUNCHING DEVICE MAKING LARGE RECTANGULAR HOLES IN RECTANGULAR TUBING AND METHOD THEREOF

BACKGROUND OF THE INVENTION

This disclosure directs itself to a punching device for punching large rectangular holes in tubing having a rectangular cross-sectional contour, including square tubing and/or square holes, and the method for punching large holes. The large holes that may be formed by the disclosed punching device and method may have a lateral extent that is substantially as large as the internal width of the tubing being punched. The terms lateral and transverse are used interchangeably herein and represent a direction that is substantially orthogonal to the longitudinal extent of the workpiece being punched.

The punching device includes a longitudinally extended mandrel over which a length of rectangularly shape tubing is sleeved. The mandrel carries a die and the punching device includes a rectangular punch arranged in correspondence with the die. More in particular, the disclosure is directed to a punching device that includes a two-sided die carried by the mandrel. The mandrel further includes a wedge member having a portion thereof with a longitudinally extended inclined surface. Displacement of the wedge member relative to the mandrel correspondingly displaces the two-sided die into contiguous contact with an internal surface of the rectangular tubing.

Further, the punching device has at least one fluid driven ram that displaces a piston rod into compressive engagement with a corresponding side of the rectangular tubing. An opposing side of the rectangular tubing is contiguous a supporting member, which may include one or more shims, and the displacement of the piston rod applies sufficient compressive force to the two opposing sides of the rectangular tubing, in correspondence with the position of the two-sided die within the tubing, to transversely elastically deform the tubing thereat. That compressive force supports that portion of the opposing sides of the tubing against deformation thereof during the displacement of the punch through a wall of tubing into the two-sided die.

Yet further, the disclosure is directed to a method of punching a large rectangular hole through a side wall of rectangularly shaped tubing. The width (transverse direction of the tubing) of the rectangular hole is limited only by the internal width of the tubing, allowing the hole to be what is considered the full width of the tubing. The method includes providing a longitudinally extended mandrel over which the rectangular tubing is removably positioned, where the mandrel carries a two-sided die. A rectangular punch is provided in alignment with the side wall of the tubing being punched and has a cutting end disposed in correspondence with and received by the two-sided die subsequent to passing through the side wall of the tubing. The width of the punch is limited only by the internal transverse dimension of the tubing. In order to punch a rectangular hole with such a large width, in addition to the use of a two-sided die, a transverse compressive force is applied to respective portions of sides of the tubing adjacent to the side wall of the tubing that is being punched and in correspondence with the position of the two-sided die within the tubing. The compressive force is of sufficient magnitude to transversely elastically deform the tubing in that portion of the adjacent sides of the tubing during punching. By that arrangement, the transverse elastic deformation of the tubing in the range of 0.015-0.020 inches provides sufficient support against deformation to the sides of the tubing during punching to obviate the need for a four sided die that would otherwise have been required, but would have limited the width of the hole. The punching operation is then carried out by reciprocatingly displacing said rectangular punch through the side wall of the tubing to form the rectangular hole therethrough, where upon the tubing is removed from said mandrel.

SUMMARY OF THE INVENTION

A method of punching a rectangular hole through a side wall of a longitudinally extended rectangularly shaped tubular workpiece is disclosed. The method includes providing a longitudinally extended mandrel over which the workpiece is removably positioned. The mandrel carries a two-sided die thereon. The method further includes providing a rectangular punch aligned with the side wall of the workpiece being punched and has a cutting end disposed in correspondence with and received by the two-sided die subsequent to passing through the side wall of the workpiece. The punch has a transverse dimension limited only by an internal transverse dimension of the workpiece. Further, the method includes applying a transverse compressive force to respective portions of sides of the workpiece adjacent the side wall of the workpiece in correspondence with the two-sided die. The compressive force is of sufficient magnitude to transversely elastically deform the workpiece and thereby support the sides of the workpiece against deformation thereof during punching. Still further, the method includes reciprocatingly displacing the rectangular punch through the side wall of the workpiece to form the rectangular hole therethrough. The method still further includes removing the workpiece from the mandrel.

From another aspect, a punching device for punching rectangular holes in a longitudinally extended rectangularly shaped tubular workpiece is disclosed. The punching device includes a longitudinally extended mandrel over which the workpiece is removably positioned. The mandrel carries a two-sided die thereon. Further, the punching device includes a rectangular punch disposed in correspondence with the two-sided die, and a first fluid driven ram configured to displace the rectangular punch through a work piece side wall and into the two-sided die. Still further, the punching device includes a second fluid driven ram configured to displace a piston rod into compressive engagement with a respective portion of a side of the workpiece adjacent the workpiece side wall in correspondence with the two-sided die. A respective portion of an opposing side of the workpiece corresponding to the two-sided die is in juxtaposition with a supporting member. The second fluid driven ram applies a compressive force to the portions of opposing sides of the workpiece of sufficient magnitude to transversely elastically deform the workpiece thereat and thereby support the opposing sides of the workpiece against deformation thereof during punching.

DESCRIPTION

In a conventional hole punching of rectangular holes in rectangular tubing, a punch external to the tubing is passed through a tubing wall into a matching die positioned inside the tubing. The die has four walls surrounding the rectangular opening into which the punch and slug that is displaced by the punch are received. The fact that the die has four walls surrounding the opening of the die and those walls must have substantial strength, limits the width of the hole that can be punched. For limited use dies, where long service life is not required, each of the die side walls on the lateral sides of the die could be as thin as $\frac{1}{8}^{th}$ of an inch, where the tubing is formed of aluminum.

Figure 13:
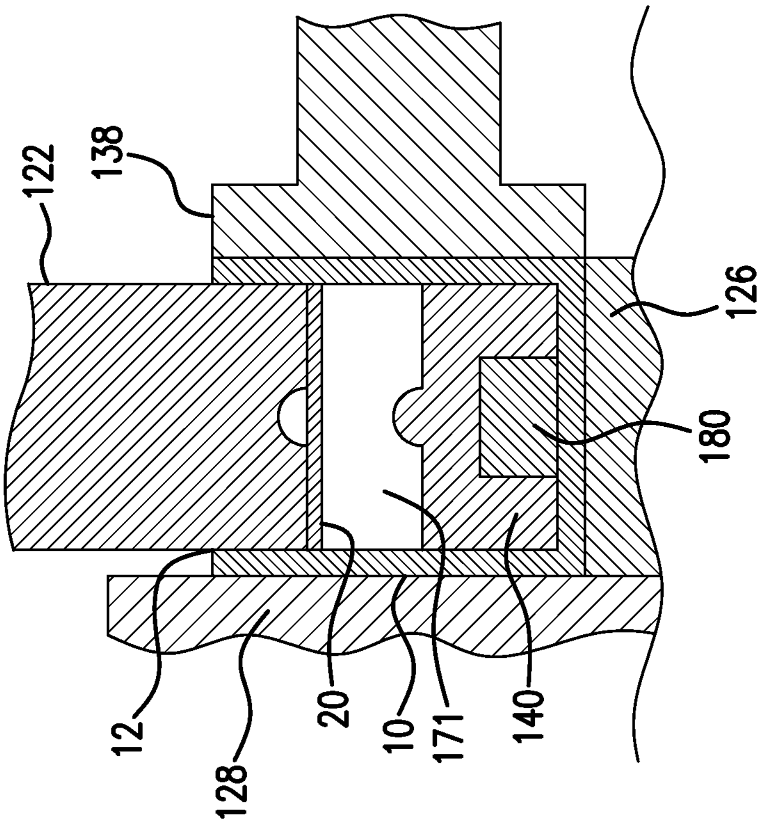
FIG. 13 is cutaway transverse cross-sectional view illustrating the displacement of the punch through the wall of the workpiece.

The disclosed rectangular tubing, rectangular hole punching device 100, shown in FIGS. 1-13, makes use of a two-sided die 170 for use in rectangular tubing, such as the workpiece 10. The two tool steel die pieces 172 and 174 of the die 170 are longitudinally spaced from each other, allowing the width of the hole being punched to extend, on the interior of the tubing, substantially from wall to wall, as illustrated in FIG. 13. This is made possible by applying a high compressive force, laterally, to the laterally spaced side walls of tubing, adjacent the side wall being punched and in correspondence with the position of the two-sided die, during the punching process. The force required will vary depending on the material of the tubing. For example, in the punching of aluminum tubing a compressive force in the range of 1,000-1,500 pounds would be necessary, while for punching stainless steel tubing a compressive force in the range of 4,000-7,000 pounds would be required to achieve the necessary support of the sides of the workpiece against deformation during the punching operation.

It has been found when the applied compressive force that is applied during punching results in a transverse elastic deformation of the workpiece side walls, in the portion of the side walls corresponding to die, is in the range of 0.015-0.020 inches, the side walls of the workpiece in that region of the workpiece are adequately supported against deformation during the punching operation. It should be understood that the transverse dimensional change that occurs during application of the lateral compressive force returns to its original state upon removal of the compressive force and hence, is defined as an elastic deformation.

Figure 1:
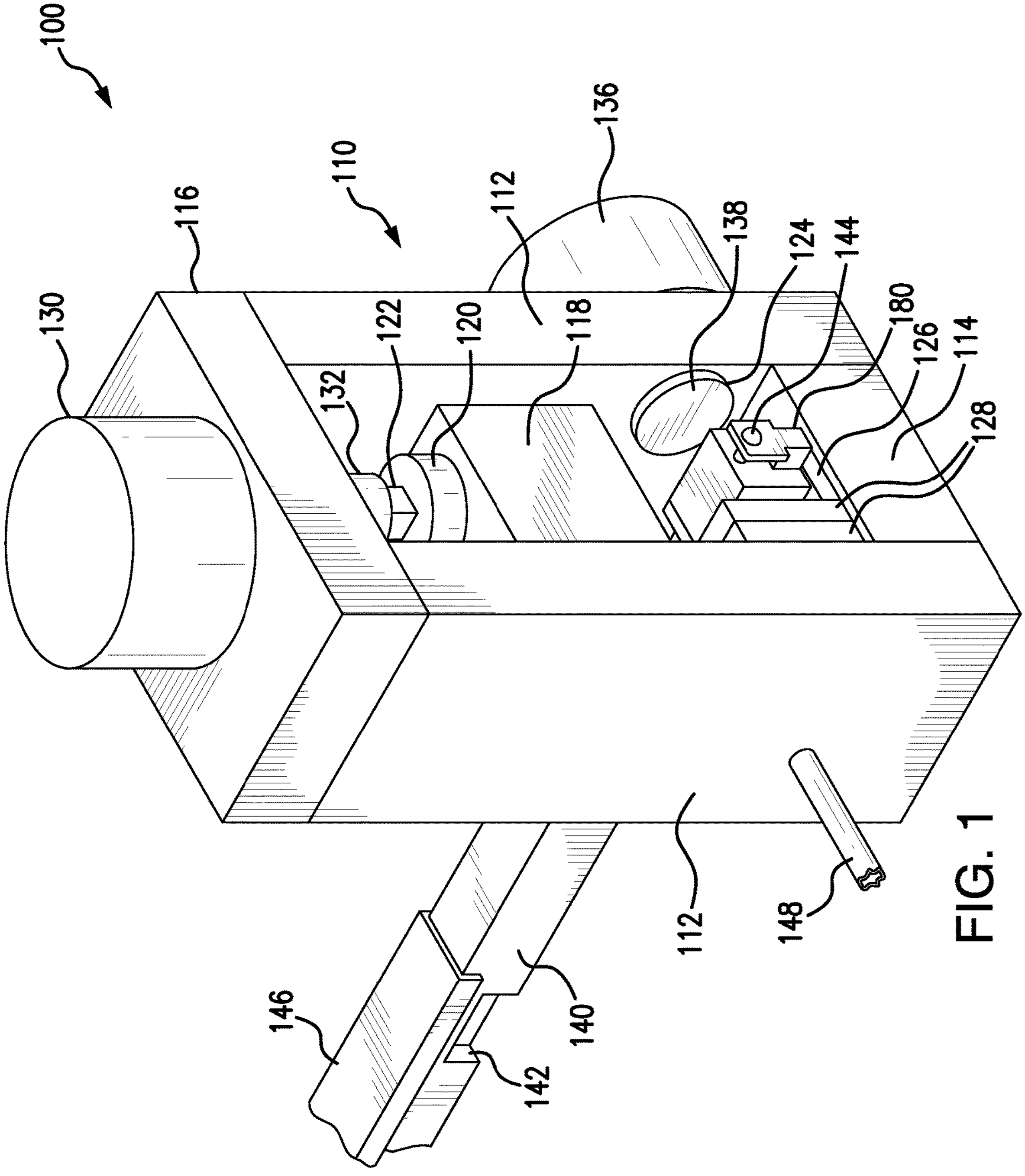
FIG. 1 is an illustration of the punching device of the present invention.
Figure 2:
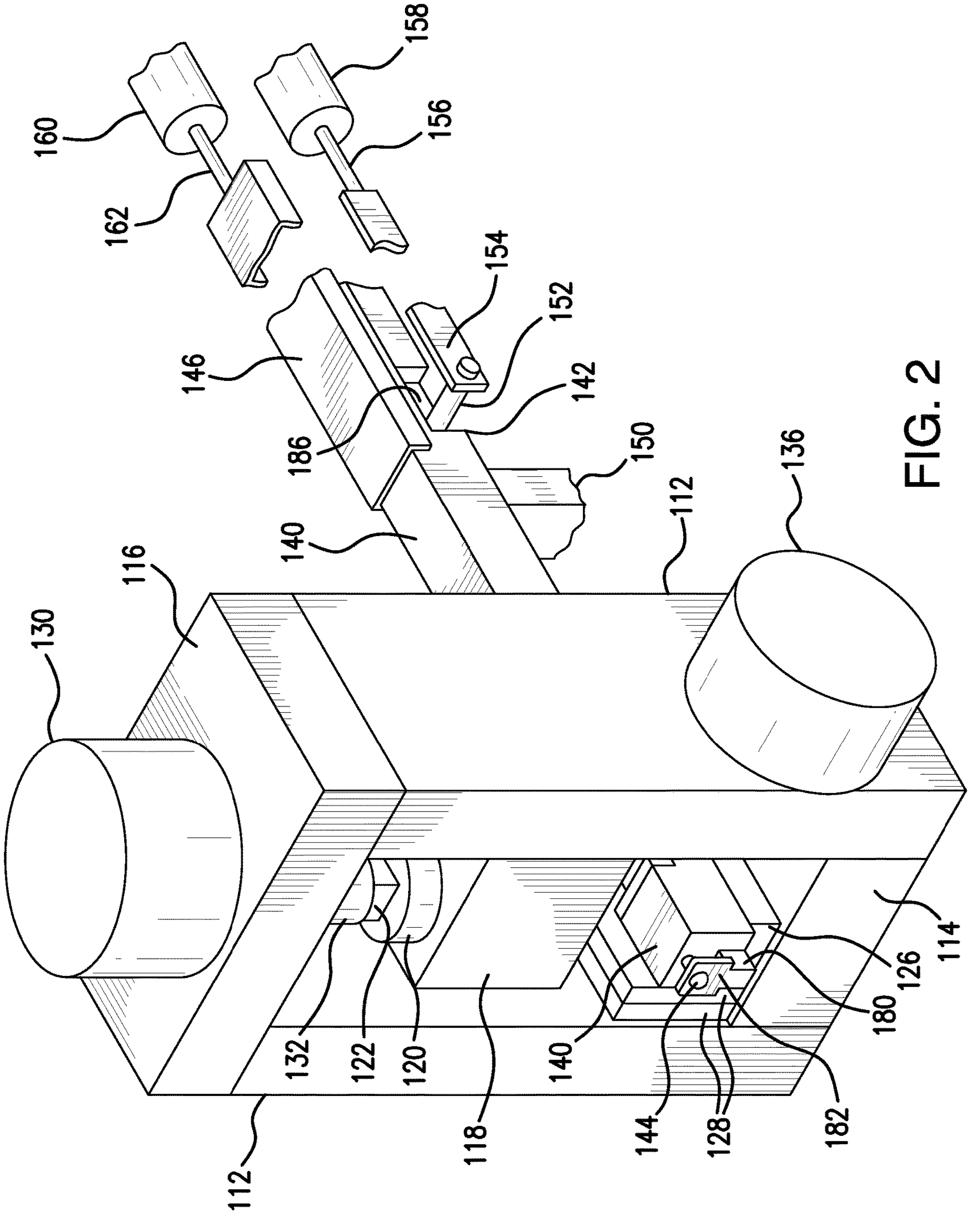
FIG. 2 is another view of the punching device of the present invention.
Figure 3:
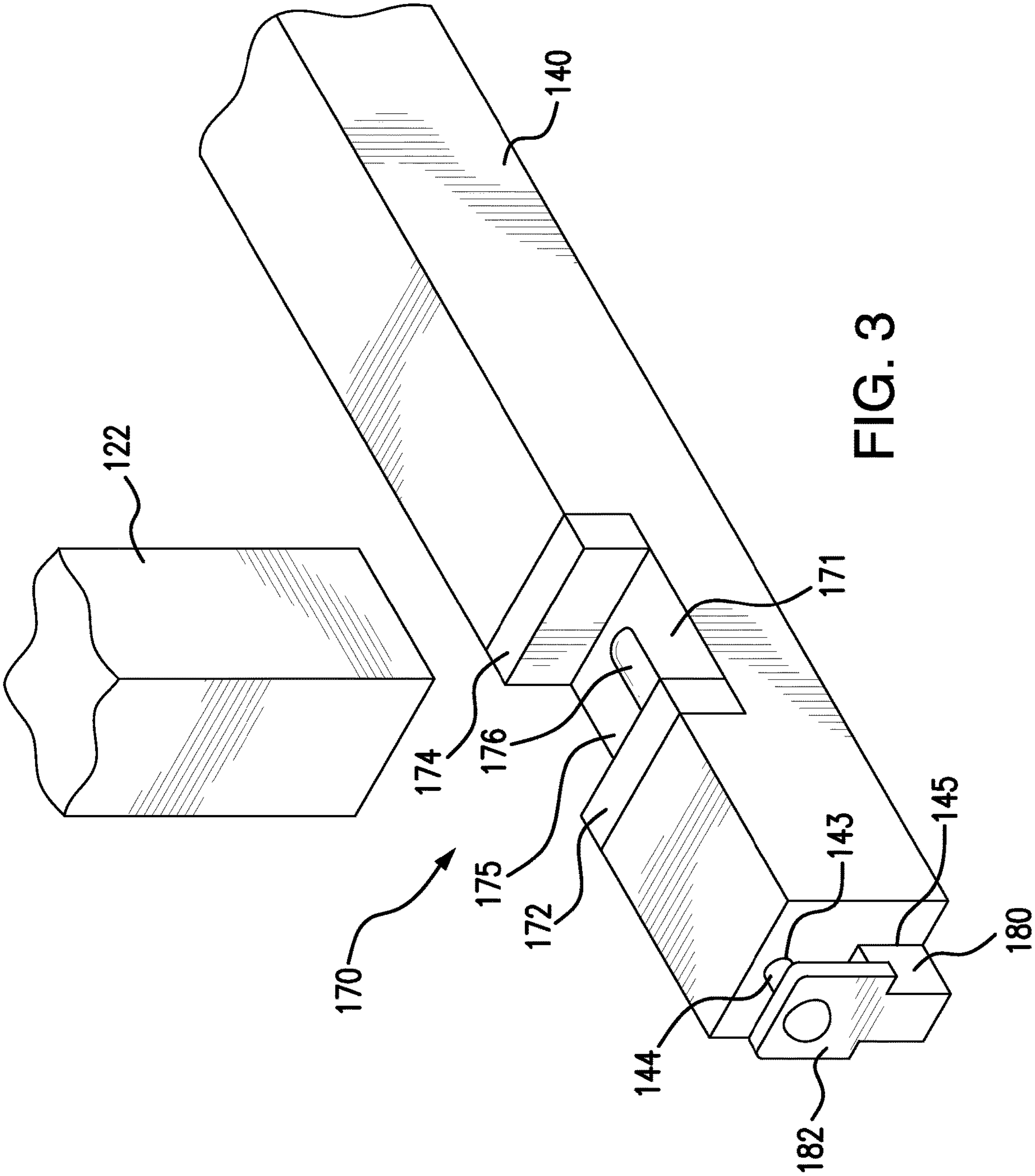
FIG. 3 is an enlarged cutaway view of the punch and two-sided die of the present invention.
Figure 4:
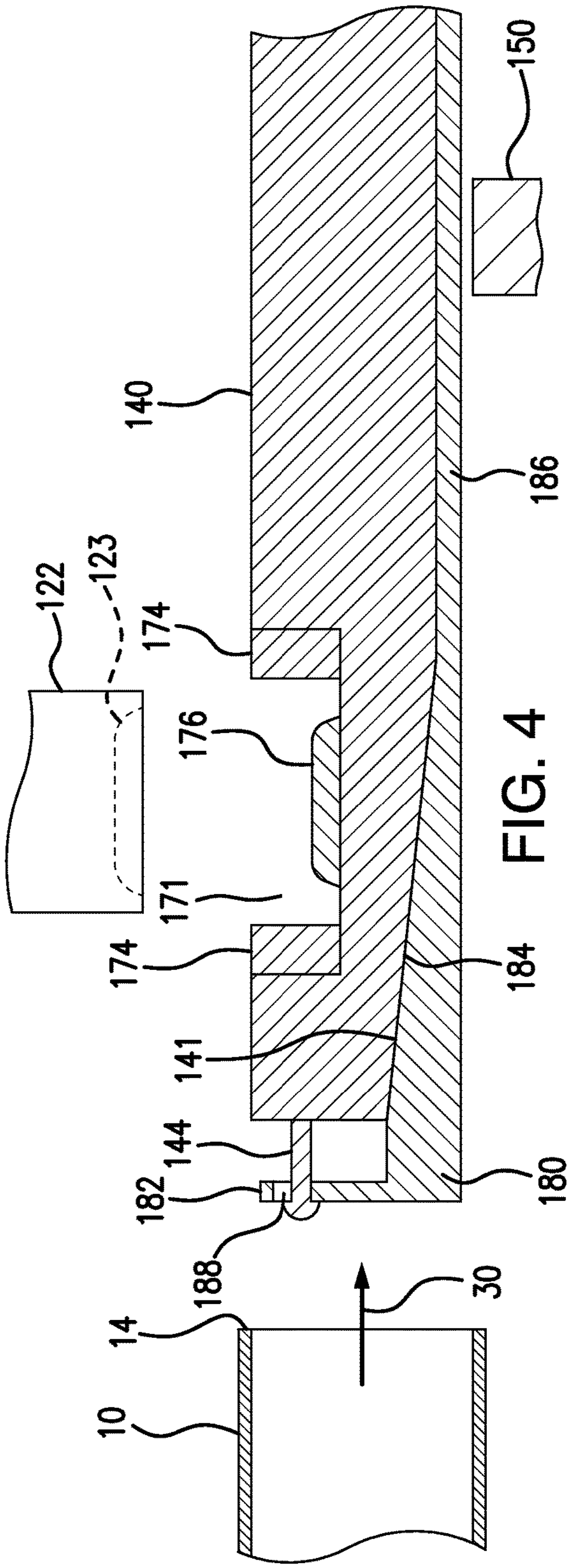
FIG. 4 is a cutaway cross-sectional view of the present invention illustrating the initial state of the mandrel and punch prior to receiving a workpiece.

Referring particularly to FIGS. 1-4, the device 100, which is a rectangular tubing, rectangular hole punching tool, includes a mandrel 140 carrying the two-sided die 170 over which the rectangular tubing workpiece 10 is slid until it reaches a stop 150 that locates the longitudinal position of the hole 12 being punched. As best seen in FIG. 3, the two-sided die is formed in a recessed opening formed in the longitudinally extended mandrel 140. At each of the two opposing longitudinally spaced ends of the recess opening are a pair of tool steel die pieces 172 and 174, with a base surface 175 extending therebetween and a die opening 171 extending from the base surface 175 to the upper surface of the mandrel 140 and between opposing lateral sides of the mandrel 140. A slug shaping projection extends from the base surface 175, the function of which will be described in following paragraphs.

In the illustrated example, the bottom wall of the workpiece 10 rests on a base member 114 of the punch frame 110 of device 100, and may include one or more shims 126 between the workpiece 10 and the base member 114 so that the tool can be used with workpieces of different wall thicknesses and dimensions. A longitudinally extended mandrel 140 extends into the frame and is spaced above the base member 114 and between a pair of laterally spaced vertical support members 112. A slidable mandrel wedge 180 is positioned on the bottom side of the mandrel 140, within a channel opening 145 and along with the mandrel is disposed within the tubular workpiece 10 when the workpiece is positioned for the punching operation.

Once the workpiece 10 is positioned over the mandrel 140, the mandrel wedge 180 is pulled rearwardly, as indicated by directional arrow 32, by a piston 156 of the cylinder 158, which may be a hydraulic or pneumatic cylinder. The piston 156 is coupled to a wedge displacement operating arm 154 that is in turn coupled to a mandrel wedge operating arm 152 extending from its coupling with the distal end 186 of mandrel wedge 180, through one of a pair of longitudinally extended side openings 142 formed through opposing lateral sides of the mandrel 140, to displace the mandrel wedge 180 rearwardly. By the action of displacing the wedge in that fashion, the two-sided die 170 is forced firmly against the interior of the wall of the tubing through which the punch 122 will pass. The proximal end of the mandrel wedge 180 has an end plate 182 with an elongated through opening 188. A guide pin 144 extends through the opening 188 and is affixed within a pin receiving opening 143 and guides the proximal end of the mandrel wedge 140 during the displacement thereof.

Alternately, the guide pin 144 may be welded directly to the proximal end of the mandrel wedge 140 A portion of the upper wall of the channel opening 145 has an inclined surface 141 and the mating surface of the mandrel wedge 180 has an inclined surface 184 disposed in juxtaposition with the inclined surface 141 of mandrel channel opening. By the displacement of the mandrel wedge relative to the mandrel, that combined structure is forced into contiguous contact with the internal surfaces of the opposing vertically spaced walls of the workpiece.

The opening in the end 14 of the tubular workpiece 10 is aligned with the mandrel 140 and then the workpiece is slid thereon in the direction indicated by directional arrow 30. The outer tubular walls of workpiece surround the portion of the mandrel 140 into which the two-sided die 170 is incorporated. The portion of the outer tubular wall being punched is positioned over the two-sided die by the location of the workpiece stop 150, against which the end 14 of the tubular workpiece 10 is positioned. The workpiece stop 150 is conventional and located relative to the two-sided die in the mandrel 140 by mechanical methods, such as with a lockable slide or screw jack or other well-known methods, and are therefore not described herein.

Figure 5:
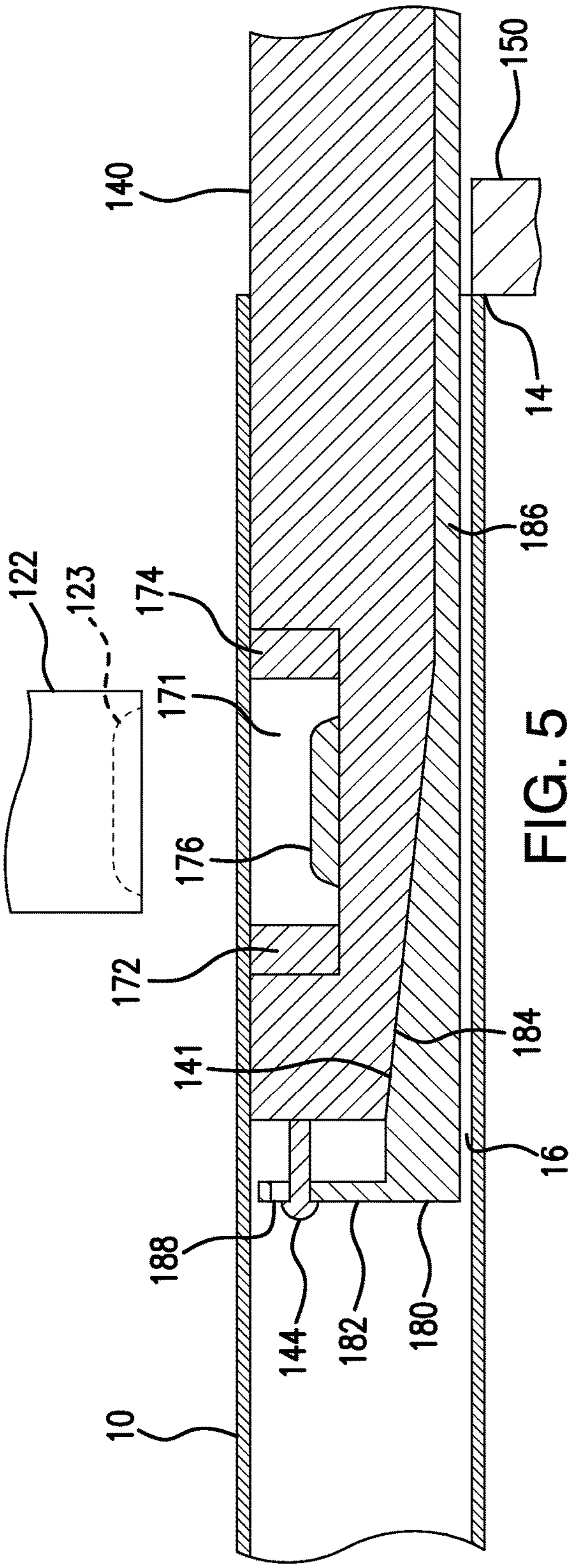
FIG. 5 is a cutaway cross-sectional view of the present invention illustrating the workpiece positioned on the mandrel.
Figure 6:
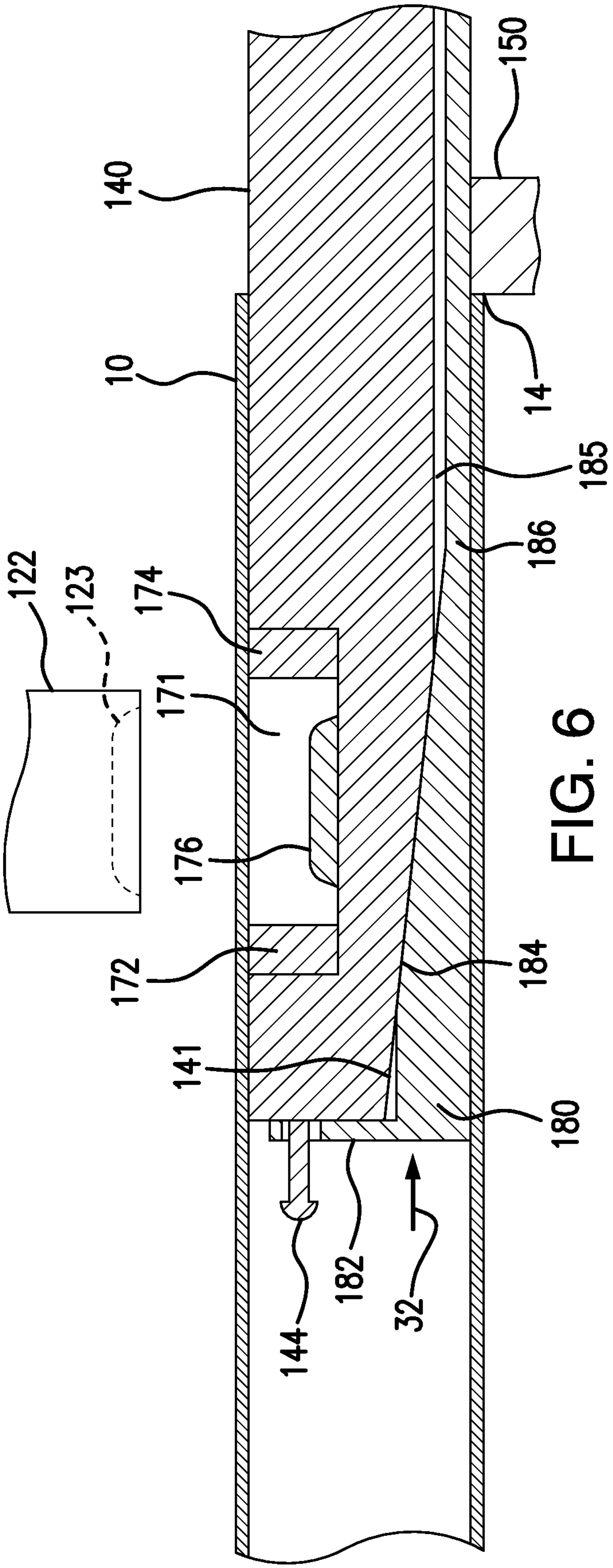
FIG. 6 is a cutaway cross-sectional view of the present invention illustrating the mandrel wedge being displaced to tightly engage the mandrel within the workpiece.
Figure 7:
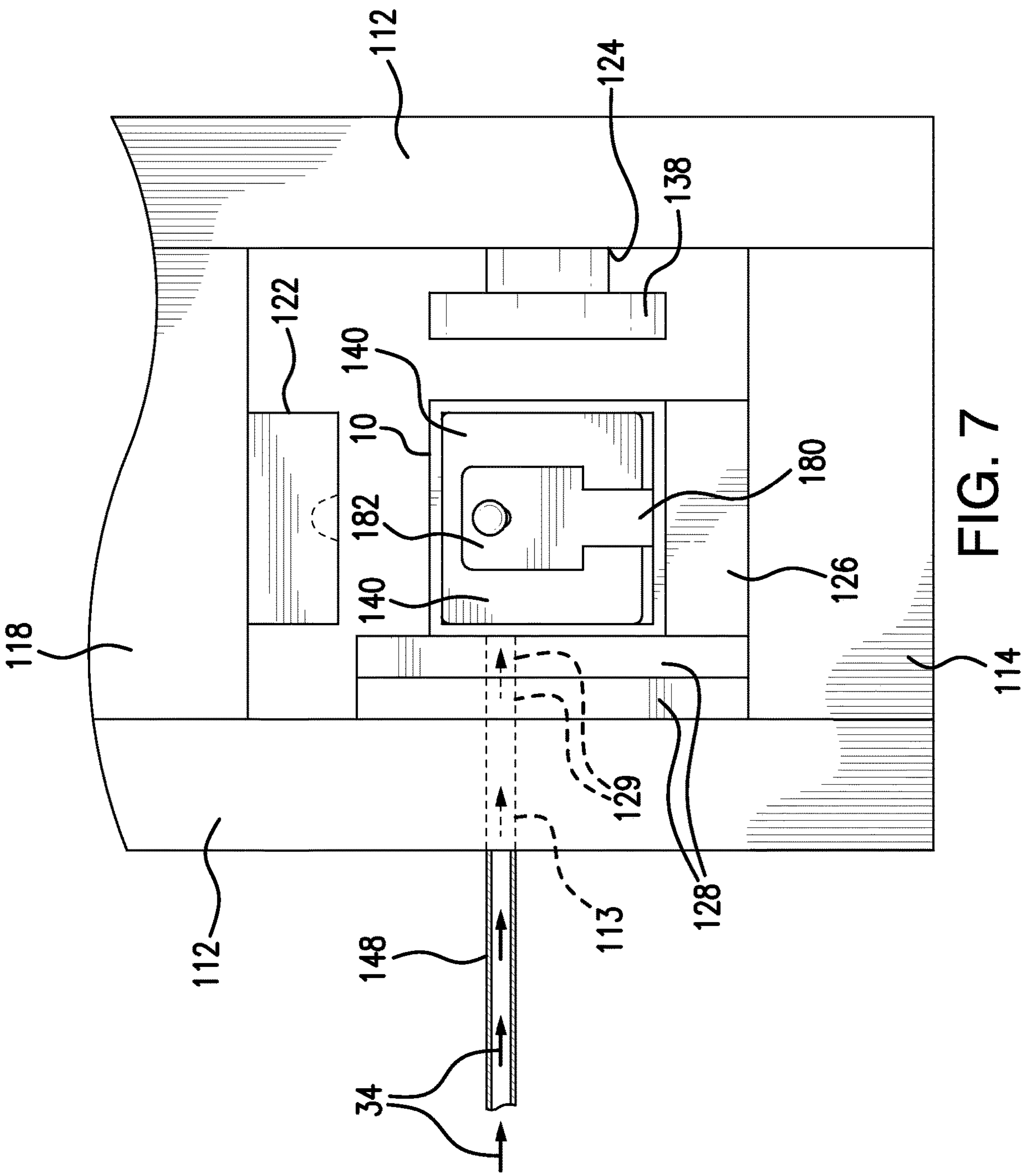
FIG. 7 is an elevation view of the punching device of the present invention illustrating the workpiece on the mandrel.
Figure 8:
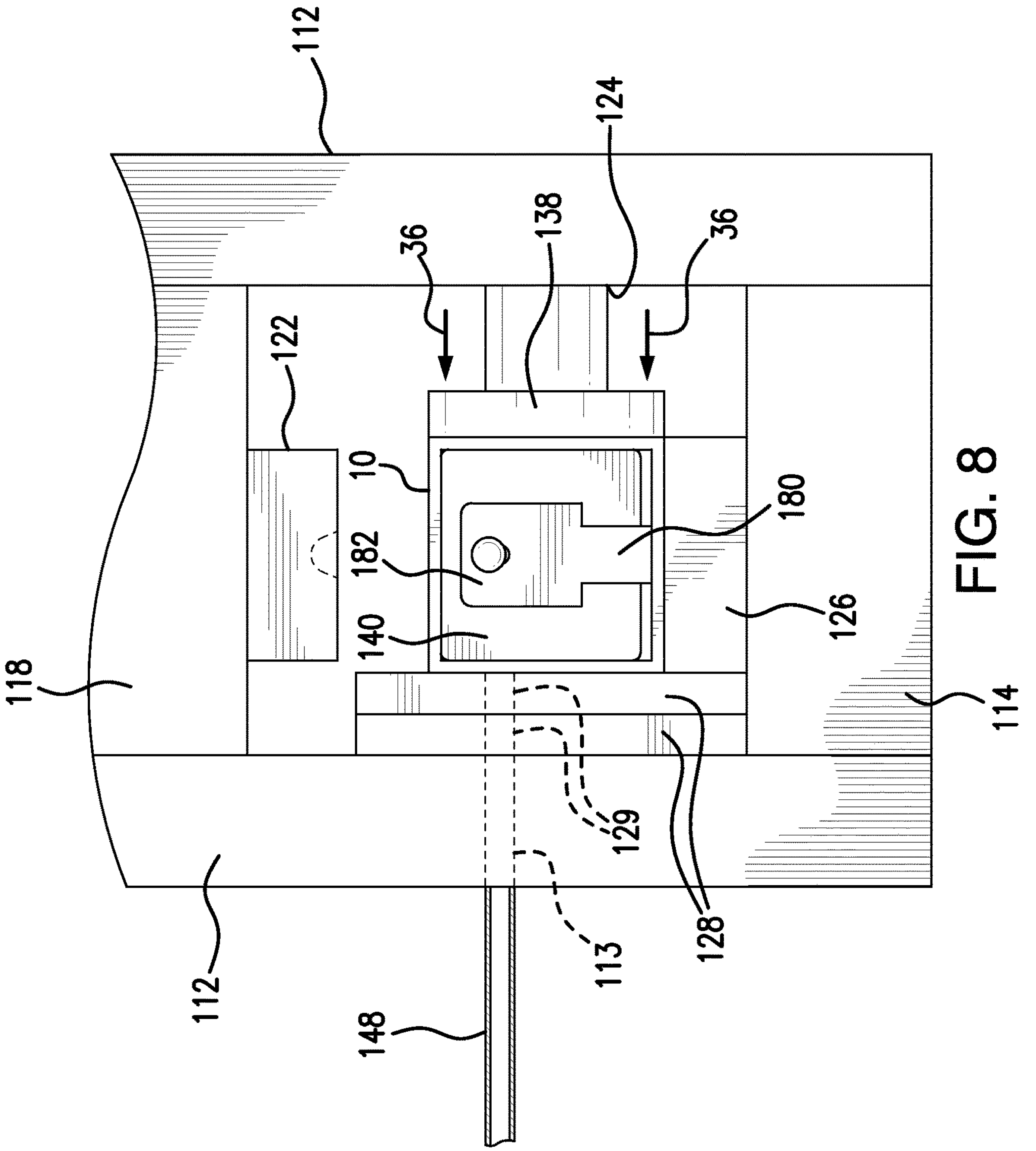
FIG. 8 is an elevation view of the punching device of the present invention illustrating application of compressive force to a workpiece in preparation for punching.
Figures 9, 10:
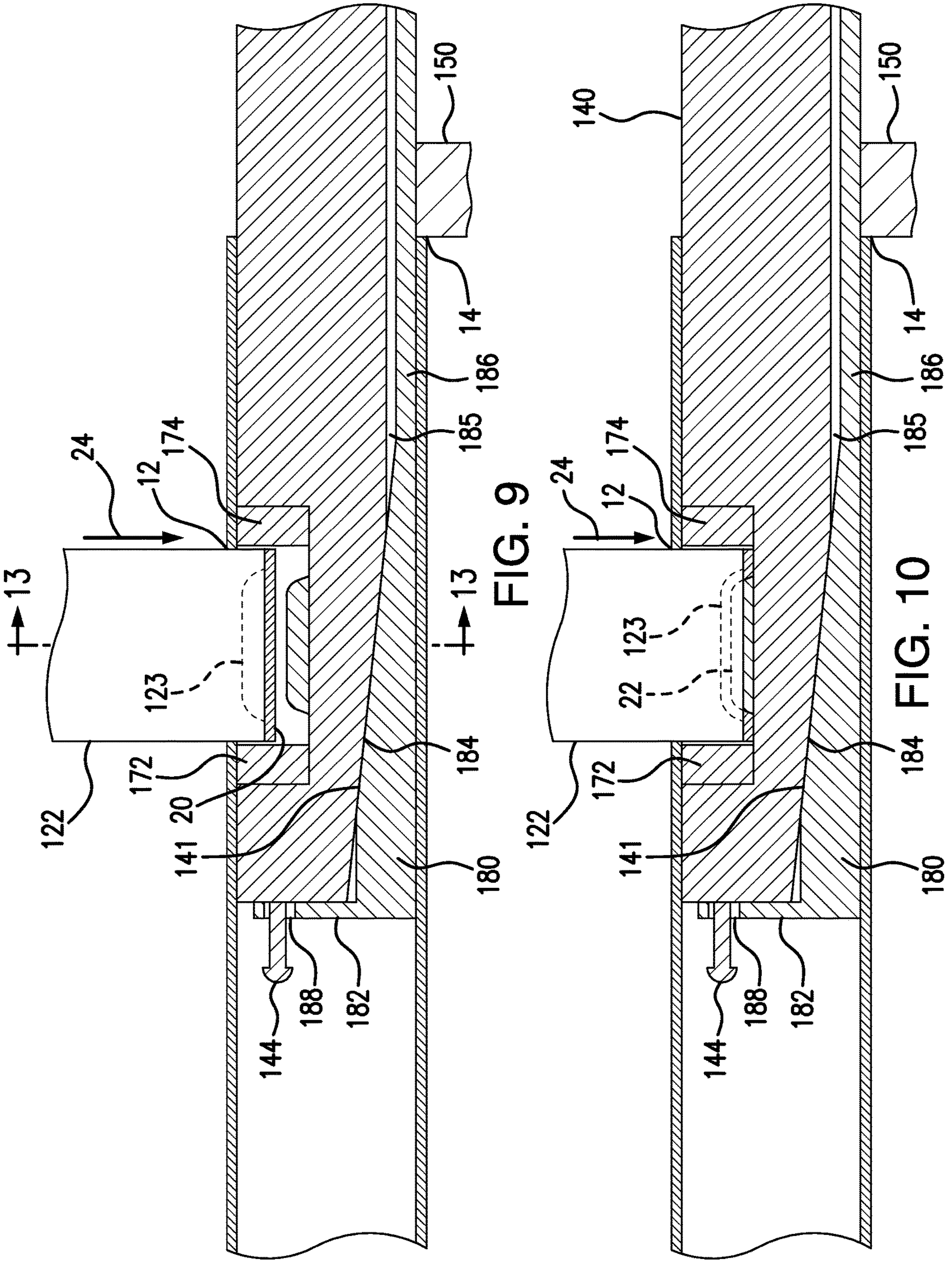
FIG. 9 is a cutaway longitudinal cross-sectional view illustrating the displacement of the punch through the wall of the workpiece.
FIG. 10 is cutaway longitudinal cross-sectional views illustrating the full displacement of the punch and shaping of the punched slug.
Figure 11:
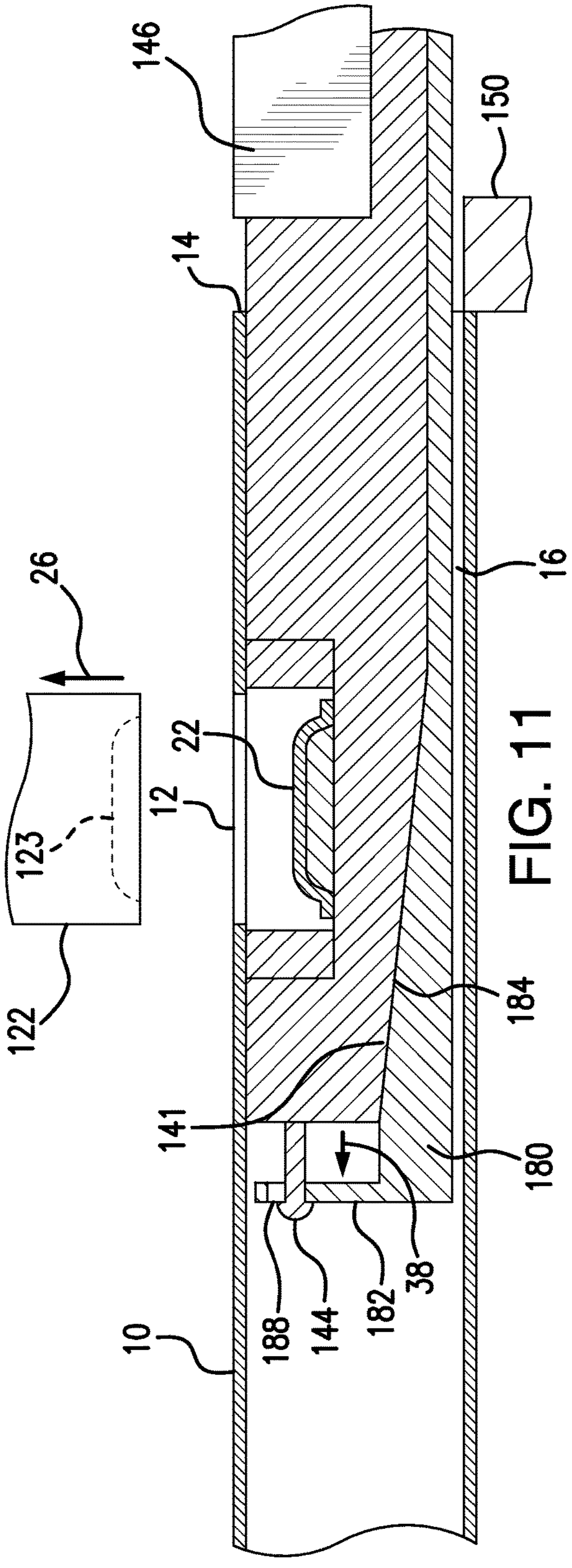
FIG. 11 is cutaway longitudinal cross-sectional views illustrating withdrawal of the punch from the workpiece.
Figure 12:
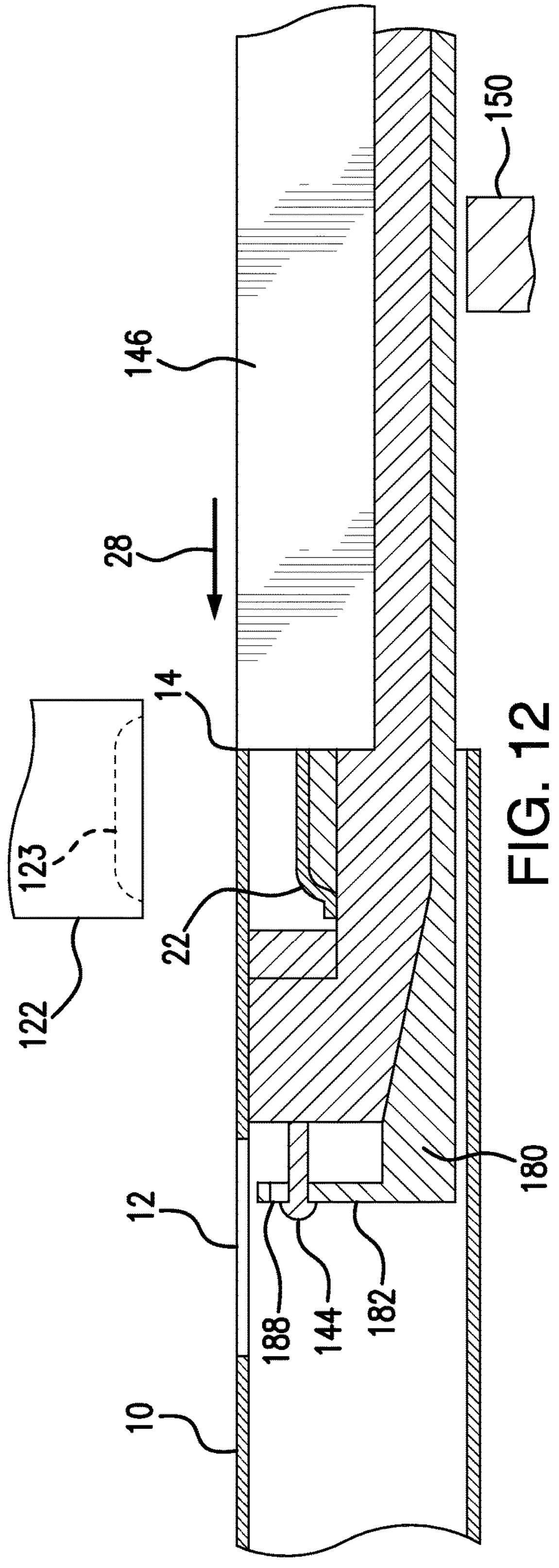
FIG. 12 is cutaway longitudinal cross-sectional views illustrating ejection of the workpiece from the mandrel of the present invention.

With additional reference to FIGS. 5 and 6, it can be seen that initially the mandrel wedge 180 is at its most forward position, with the end plate 182 located against a head portion of the guide pin 144 and the mandrel 140 and mandrel wedge 180 are spaced away from the corresponding interior side of the workpiece 10 by a clearance gap 16. Thus, the two-sided die 170 carried by mandrel 140 is not forced against the interior side of workpiece 10 to be punched.

Once the workpiece 100 is positioned on the mandrel 140 with the workpiece end 14 against the stop 150, the two-sided die 170 is brought into tight juxtaposition with two opposing interior surfaces of the workpiece 10, the interior surface of the side being punched and the surface of the opposing side thereto. The tightening of the mandrel 140 within the workpiece 10 is accomplished by displacement of the mandrel wedge 180 relative to the mandrel 140 in the direction indicated by directional arrow 32. The mandrel wedge 180 is disposed in a channel opening 145 formed in one side of the mandrel 140 (FIG. 3) opposite to the side on which the two-sided die 170 is located. Displacement of the mandrel wedge 180 relative to the mandrel 140 causes a sliding displacement of the wedge inclined surface 184 along the mating inclined surface 141 formed in an upper wall of the channel opening 145. That displacement results in the mandrel wedge 180 occupying what was the clearance gap 16 and fully occupying the interior space, in the direction of punching, of the workpiece. While along the distal end 186 of the mandrel wedge 180, the distal end 186 is spaced from the distal end portion of upper wall of the channel opening 145.

Referring particularly to FIGS. 1, 2 and 6-13, the system method that enables substantially "full width" punching using a two-sided die will be discussed. In order to provide support to the sides of the tubing adjacent to the side wall being punched, piston 138 of compression force cylinder 136 is displaced toward a side of the workpiece, in the direction indicated by directional arrows 36, to apply a high compressive force against the sides of the workpiece 10 prior to punching and subsequent to the displacement of the mandrel wedge 180 to force the two-sided die in contiguous contact with the interior side of the punching site. Compression force cylinder 136 is affixed to the corresponding vertical support wall 112 and the piston 138 operates through an opening 124 formed through that vertical support wall 112. The opposing side of the workpiece 10 is disposed against the other solid vertical wall of the frame 110, which may include one or more shims 128 shim to allow for adjustment to accommodate tubing of different outer lateral dimensions, and adjustment of the compressive force being applied at the full stroke of the piston 138. Compression force cylinder 136 may be a pneumatic or hydraulic cylinder, depending upon the amount of compressive force required to be applied to the workpiece 10, which will depend upon the material of which the workpiece 10 is formed and the wall thickness being punched. The desired compressive force causes an elastic deformation of the tubing width, the dimension of the lateral span of the tubing, in the range of 0.015-0.020 inches. Once the compressive force is removed, the tubing width springs back to its original state.

As the stroke of the piston 138 is fixed, or may be limited by a mechanical stop affixed to the frame 110, the compressive force is adjusted by use of one or more shims inserted between the corresponding vertical support wall 112 of the frame 110 and side of the workpiece 10. In one exemplary working embodiment, where the workpiece is aluminum tubing, the compression force cylinder 136 may be a pneumatic cylinder and the compressive force required will be in the range of 1,000-1,500 pounds. In another exemplary working embodiment, where the workpiece is stainless steel tubing, the compression force cylinder 136 is a hydraulic cylinder for generating a compressive force in the range of 4,000-7,000 pounds to achieve the desired transverse elastic deformation.

Once the workpiece compressive force has been applied, the punch 122 is cycled to be displaced, in the direction indicated by directional arrow 24, through a side wall of the workpiece 10 and then withdrawn, in the direction indicated by directional arrow 26. The punch 122 is displaced by a fluid driven ram formed by a double acting punch driving cylinder 130 supported on the upper support 116 of the punch frame 110. The punch driving cylinder 130 includes a piston rod 132 coupled to the punch 122 for reciprocally displacing the punch. The punch 122 is slidably supported by a punch guide or holder 120 that is mounted in a punch support member 118 secured between the two vertical support walls 112 of the punch frame 110.

Then, after the punching cycle has been completed, the piston 138 is retracted by the compression force cylinder 136, and the wedge is displaced outwardly, in the direction indicated by directional arrow 38, by the cylinder 158, which is also a double acting cylinder, to unload the force it had generated and thereby release the mandrel from its contiguous contact with the internal surfaces of the workpiece 10. Lastly, a further double acting workpiece ejection cylinder 160 is operated to push the workpiece from a portion of the mandrel and thereby ensure it is free to be manually removed from the remaining portion of the mandrel. The operation of cylinder 160 displaces the workpiece ejection piston 162 and the workpiece ejection member 146 that is coupled to the workpiece ejection piston 162, in the direction indicated by directional arrow 28. The workpiece ejection member 146 contacts the distal end 14 of the work piece 10 and displaces the workpiece along the mandrel 140 a distance corresponding to the stroke of the cylinder 160. The workpiece ejection piston 162 is subsequently retracted to prepare the device 10 for receipt of another workpiece.

Before another punching operation can be commenced, the slug 20 which is the portion of the side wall removed to form the punched opening 12 by the punching operation just completed, must be removed from the device 100. As the clearance between the longitudinal dimension of the punch and the distance between the two tool steel die pieces 172 and 174 is very small, as is typical in the art, the slug 20 may fit tightly in the die. By forming a "dimple" in the slug 20, its overall dimensions will be reduced as an effect of the forming operation, making it easier to eject from the two-sided die 170. The two-sided die 170 may include a semi-spherical button or an oval shaped projection 176, as examples of possible shapes, on the base surface 175 thereof and the end of the punch 122 has a correspondingly shaped recess 123 formed therein and disposed in correspondence to the projection 176 to deform the slug 20 when the punch caring the slug presses the slug onto the projection at the die at end of its stroke. The process of deforming the slug transfers it to the die and the resulting reduction in the overall longitudinal dimension thereof makes it easy for it to be ejected from the die. In device 100, an air inlet line 148 directs a blast of compressed air, as indicated by the air flow directional arrows 34, through air passages 113 and 129 to remove the shaped slug 22 after the workpiece is pulled off the mandrel (illustrated in FIG. 7 with the workpiece 10 still present so that the drawing figure may be used to show multiple stems of the punching process).

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is claimed is:

1. A method of punching a rectangular hole through a selected side wall of multiple side walls of a longitudinally extended rectangularly shaped tubular workpiece, comprising:

providing a mandrel that extends in a longitudinal direction, said mandrel carrying a two-sided die thereon, said two sided die having a die opening, and wherein the workpiece is removably sleeved over said mandrel;

providing a rectangular punch aligned with the selected side wall of the workpiece and having a cutting end disposed in correspondence with and received by said die opening of said two-sided die subsequent to being displaced in a direction to pass through the selected side wall of the workpiece, said direction defining a punching direction and said punch having a dimension in a direction transverse with respect to both the punching direction and the longitudinal direction, the dimension of the punch in the transverse direction being limited only by an internal dimension of the workpiece in the transverse direction between side walls of the workpiece adjacent the selected side wall;

applying a compressive force by a piston rod in the transverse direction to respective portions of the multiple side walls of the workpiece adjacent the selected side wall of the workpiece in correspondence with said die opening of said two-sided die, said compressive force being of a magnitude to elastically deform the workpiece in the transverse direction in a range of 0.015-0.020 inches and thereby support the multiple side walls of the workpiece against deformation thereof during punching of the rectangular hole;

reciprocatingly displacing said rectangular punch through the selected side wall of the workpiece to form the rectangular hole therethrough; and removing the workpiece from said mandrel.

2. The method of claim 1, wherein said providing said mandrel includes providing said mandrel having a displaceable wedge member, said wedge member being displaceable from a first position to a second position to correspondingly displace said two-sided die into juxtaposition with an internal surface of the selected side wall of the workpiece being punched.

3. The method of claim 2, wherein said providing said mandrel having a displaceable wedge member includes providing an inclined surface on a portion of said mandrel extending in the longitudinal direction and providing a corresponding portion of said displaceable wedge member with an inclined surface extending in the longitudinal direction in juxtaposition with said inclined surface of said mandrel.

4. The method of claim 1, wherein said applying a compressive force includes operating a fluid powered cylinder to displace the piston rod thereof into compressive engagement with a corresponding one of the side walls of the workpiece adjacent the selected side wall being punched.

5. The method of claim 1, further comprising removing a punched slug from said two-sided die.

6. The method of claim 5, wherein said removing the punched slug from said two-sided die includes providing a protrusion extending from a bottom surface of said two-sided die and a corresponding recess in an end surface of said cutting end of said rectangular punch, the punched slug being shaped by said protrusion and recess.

7. The method of claim 6, wherein said removing the punched slug from said two-sided die further includes directing compressed air toward the shaped slug to displace the shaped slug from said two-sided die.

8. The method of claim 1, wherein said providing a mandrel includes forming said die opening in the mandrel and affixing a pair of tool steel die pieces to opposing longitudinal ends of said die opening.

9. The method of claim 1, wherein the step of providing a rectangular punch includes selecting the transverse dimension of the punch to form a rectangular hole where opposing transverse edges thereof are proximate to the respective portions of the sides of the workpiece.

10. A punching device for punching rectangular holes in a longitudinally extended rectangularly shaped tubular workpiece, said punching device comprising;

a mandrel extending in a longitudinal direction and configured for removably receiving the workpiece sleeved thereon, said mandrel including a two-sided die positioned thereon;

a rectangular punch disposed in correspondence with said two-sided die;

a first fluid driven ram configured to displace said rectangular punch through a selected side wall of the workpiece and into said two-sided die, the rectangular punch displacement defining a punch direction; and a second fluid driven ram configured to displace a piston rod into compressive engagement with a respective portion of one of a pair of opposing side walls of the workpiece adjacent the selected side wall in correspondence with said two-sided die, another respective portion of the other of the pair of opposing side walls of the workpiece being disposed in correspondence with said two-sided die and being in juxtaposition with a supporting member, and said second fluid driven ram being displaced in a direction transverse with respect to both the longitudinal and punch directions to apply a compressive force to the respective portions of the pair of opposing side walls of the workpiece adjacent the selected side wall, the compressive force being of a magnitude to elastically deform the workpiece in a range of 0.015-0.020 inches and thereby support the side walls of the workpiece against deformation thereof during punching.

11. The punching device of claim 10 wherein said punch has a dimension extending in the transverse direction limited in extent only by an internal dimension in the transverse direction between the pair of opposing side walls of the workpiece adjacent the selected side wall.

12. The punching device of claim 10 wherein said two-sided die includes a die opening formed in said longitudinally extended mandrel and a pair of tool steel die pieces affixed to opposing longitudinal ends of said die opening.

13. The punching device of claim 10 wherein said longitudinally extended mandrel includes a displaceable wedge member, said wedge member being displaceable from a first position to a second position, said wedge member displacing said two-sided die into juxtaposition with an internal surface of the workpiece corresponding to the selected side wall responsive to the wedge member being displaced to said second position.

14. The punching device of claim 13 wherein said mandrel has an inclined surface of on a portion thereof extending in the longitudinal direction and said wedge member has an inclined surface extending in the longitudinal direction in juxtaposition with said inclined surface of said mandrel.

15. The punching device of claim 10 further comprising a workpiece ejection member disposed adjacent a portion of the mandrel and being operable to displace the workpiece at least partially from the mandrel.

16. A punching device for punching rectangular holes in a longitudinally extended rectangularly shaped tubular workpiece, said punching device comprising;

a mandrel extending in a longitudinal direction and configured for removably receiving the workpiece sleeved thereon, said mandrel including a two-sided die positioned thereon, said two-sided die including a die opening formed in said longitudinally extended mandrel, a pair of tool steel die pieces affixed to opposing longitudinal ends of said die opening, and a protrusion extending from a bottom surface of said two-sided die into said die opening between said pair of tool steel die pieces;

a rectangular punch disposed in correspondence with said two-sided die, said punch including a recess formed in an end surface of a cutting end of said rectangular punch and in correspondence with said protrusion of said two-sided die to shape a slug punched from the workpiece;

a first fluid driven ram configured to displace said rectangular punch through a selected side wall of the workpiece and into said two-sided die, the rectangular punch displacement defining a punch direction; and a second fluid driven ram configured to displace a piston rod into compressive engagement with a respective portion of one of a pair of opposing side walls of the workpiece adjacent the selected side wall in correspondence with said two-sided die, another respective portion of the other of the pair of opposing side walls of the workpiece being disposed in correspondence with said two-sided die and being in juxtaposition with a supporting member, and said second fluid driven ram being displaced in a direction transverse with respect to both the longitudinal and punch directions to apply a compressive force to the respective portions of the pair of opposing side walls of the workpiece adjacent the selected side wall, the compressive force being of a magnitude to elastically deform the workpiece and thereby support the side walls of the workpiece against deformation thereof during punching.

17. The punching device of claim 10 wherein said punch has a dimension extending in the transverse direction to form a rectangular hole where opposing transverse edges thereof are proximate to the respective portions of the sides of the workpiece.

* * * * *